3,354,652
ROCKET THRUST CHAMBER
Raymond J. Novotny, Mount Fern, N.J., and Frank R. Dunn, Prairie City, Iowa, assignors to Thiokol Chemical Corporation, Bristol, Pa., a corporation of Delaware
Filed Apr. 23, 1965, Ser. No. 450,366
17 Claims. (Cl. 60—260)

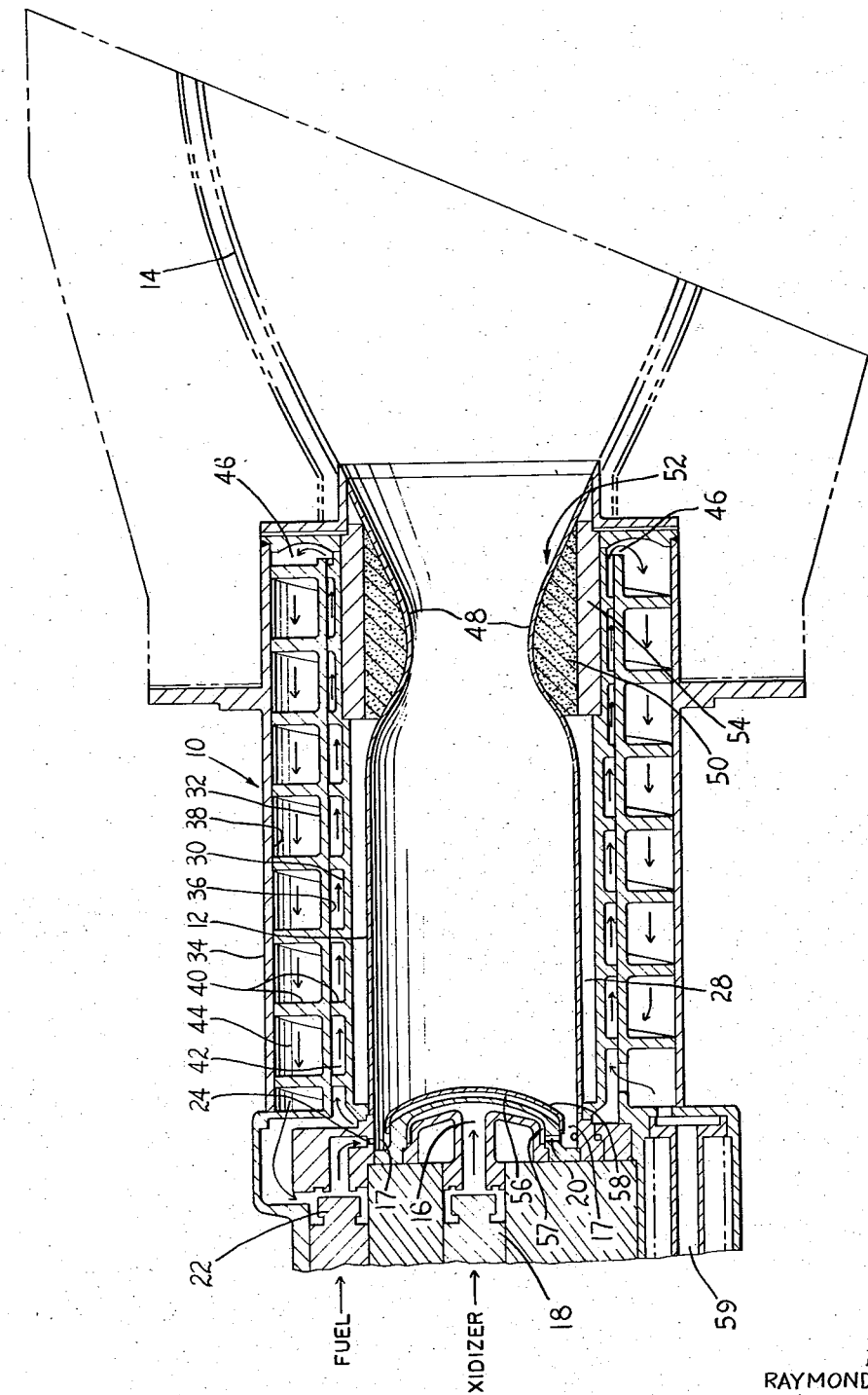

This invention relates generally to rocket powerplants and more particularly to an improved means and method of cooling a rocket thrust chamber.

Small liquid propellent rocket engines (approximately 100 pounds of thrust or less) are more difficult to cool regeneratively than are larger engines. This is due to the increase in the ratio of surface to be cooled in relation to the flow rate of coolant (propellant) doing the cooling. As a result, the bulk temperature rise of the coolant becomes excessive, especially if low jacket pressures are required because of a low supply tank pressure. The latter condition is invariably the case for pressurized propulsion systems used in space missions. Therefore, boiling or decomposition of the coolant can occur within the cooling jacket of the rocket engine.

In order to substantially decrease the heat transferred to the coolant, a high temperature insulation typified by the metal oxides ($ZrO_2$, $HFO_2$ etc.) can be applied to the inside surface (combustion gas side) of the rocket engine. This approach reduces the coolant bulk temperature rise substantially during the steady state firing of the rocket engine. However, upon shut down of the engine, the additional heat stored in the newly added insulation causes excessive local heating and possible decomposition of the stagnant propellant within the coolant jacket. Upon restart, the flow of two-phase liquid incites erratic pressure fluctations within the combustion chamber and, in general, is responsible for sluggish and non-repeatable engine starting characteristics. A reproducible starting transient (thrust-time curve) is of paramount importance for precise space craft control. Therefore, a rocket engine design was evolved to correct the basic difficulties inherent in operating a regeneratively cooled liquid rocket engine to a pulse mode (start and stop) duty cycle.

The present inventors have effectively solved this problem by a novel construction which includes a full-diameter vortex injector, an inner wall or radiation liner having a low mass and low heat emissivity surface, a stagnant gas or vacuum enclosed space between the radiation liner and the outer wall and helically-oriented two-way flow coolant channels formed by cooling fins.

The main object of the present invention is to provide an improved thrust chamber for rocket engines which will not be subject to the above and other excessive temperature problems.

An important object of the present invention is to provide an improved thrust chamber construction for rocket engines which combines the radiation mode of heat transfer with the cylindrical cooling jacket of the "vortex" injector to overcome the basic difficulties associated with purely regenerative engines.

A further important object of the present invention is to provide an improved thrust chamber construction which in the chamber section will use a minimum mass thermal barrier to block the transfer of heat, and slowly transfer the heat stored in the chamber on shut-down to a heat sink to prevent excessive local transient gradients and optimize use of the heat sink; and which in the nozzle section will also use a minimum mass thermal barrier to block the transfer of heat, and minimize insert thermal storage by decreasing insert mass and insert specific heat while retaining good thermal conductivity within the insert and with the coolant jacket.

Another important object of the present invention is to provide an improved rocket thrust chamber of the "vortex" injection type which has a full chamber diameter vortex, a low mass radiation liner with a radiation thermal barrier behind it, a minimum heat storage nozzle insert, a double coolant jacket with coolant fins to increase heat sink and heat sink effectiveness, and a low jacket coolant velocity to obtain fast subsystem response.

A further important object of the present invention is to provide an improved coolant jacket for the thrust chamber of regenerative rocket engines which includes concentric helical passages and in-line cooling fins to effect improved cooling.

A still further important object of the present invention is to provide an improved coolant jacket for the thrust chamber of a regenerative rocket engine which employs a very low coolant velocity.

Other objects and advantages of the invention will become apparent during the course of the following description.

In the drawings we have shown one embodiment of the invention. In this showing:

The figure is a central, longitudinal sectional view of the invention.

Referring to the drawings, numeral 10 designates as a whole the rocket thrust chamber comprising the invention which includes a combustion chamber terminating in an expansion cone or exhaust nozzle defined respectively by a radiation liner 12 and 14. The thrust chamber is closed at its left end by an injector 16 of the "vortex" type which communicates therewith for the injection of propellants therein, which propellants may be an oxidizer and a fuel such as nitrogen tetroxide and monomethylhydrazine respectively.

The oxidizer, under the control of a poppet valve 18, enters centrally of the injector and is injected radially into the vortex annulus 17 of the thrust chamber by circumferentially spaced injection ports 20 while the fuel is controlled by a poppet valve 22 and is injected tangentially into the annulus 17 of the thrust chamber by correspondingly spaced, injection ports 24. The flow of the mixed propellants and the full diameter, hot vortex core is indicated at 26.

The purpose of using a full diameter vortex is to lay down a uniform and effective boundary layer of cool, fuel-rich combustion products from the vortex annulus 17 and out along the chamber radiation liner 12 with minimum flow disturbance, and to also maintain a uniformly cool, injector-end of the thrust chamber to minimize soak back into the propellant valves.

The thrust chamber radiation liner 12 is designed to block heat flow without incurring excessive heat storage and is formed of tantalum alloy. If the radiation liner was used in a conventional manner, the thrust chamber would suffer from the same difficulties (excessive chamber and throat temperatures) as pure radiation engines. However, when the radiation liner is used in combination with a full diameter vortex injector, the maximum liner temperature is only 2000° F. and this near the nozzle insert end, with the injector end of the radiation liner operating at 500° F.

It is to be noted that the gradual increase in temperature (500–2000° F.) along the length of the radiation liner 12 has three fundamental advantages. First, the low average temperature of the radiation liner reduces thermal storage; second, a gradual and uniform heating and burning of the fuel and fuel-rich gases is assured prior to their entering the convergent section of the nozzle 14; and lastly a low emissivity surface finish (high reflectivity) can be readily sustained on the backside of the liner in the form of a stagnant gas or vacuum gap 28 formed concentrically with the thrust chamber 10.

The second advantage is indicative of the reason why the novel thrust chamber of the present invention achieves 98% characteristic velocity (C*) ratio based on shifting equilibrium and why full contact type liners (cooler as-side walls) show a 3–4% decrease in C* ratio compared to the radiation liner approach. The thickness of the liner 12 is .035 inch and has .015 to .020 inch of $HfO_2$ over a phonograph finish which locks-on the plasma sprayed $HfO_2$. Although a tantalum base alloy (T–222) is employed, the temperatures obtained indicate that more conventional alloys such as those having a nickel and cobalt base may be employed and still survive the thrust chamber environment.

The radiation thermal barrier or annular gap 28 is defined by a coolant jacket formed of a plurality of concentric cylinders 30, 32 and 34 closed at their ends and mounted on the thrust chamber, which also respectively define inner and outer coolant chambers 36 and 38 for the circulation therein of a coolant which in the present instance comprises the fuel. The coolant chambers are provided with and connected by radially aligned cooling fins 40 which are helically disposed therein to define radially inner and outer coolant passages 42 and 44 which are in communication as at 46 at their ends adjacent the throat 48 of the exhaust nozzle 14. The large area of wetted perimeter of the fins to flow area provides good thermal diffusion of the heat into the coolant.

The fuel regeneratively cools the thrust chamber by passing from a fuel manifold 59 rearwardly along the inner coolant passages 42 past the throat area to 46 wherein it passes radially outward into the outer coolant passages 44 and forwardly to the injector 24 where its admission to the vortex annulus 17 is controlled by the valve 22. It is to be noted that the outer, return passages 44 are much larger than the inner passages 42 and decrease the coolant velocity and that the latter, in the throat area, are much smaller to increase the coolant velocity and hence the cooling effectiveness.

The dual coolant jacket described is most efficient in thermal soak and is also an important feature of the invention because, after pulse mode operation, the cool propellant (coolant) reaches the critical throat section rapidly through the inner coolant passages 42 to keep the liquid-side wall temperature in this area lower than if coolant first entered the jacket through the outer passages 44. Also, on soak, if local nucleation should occur at the liquid wall in the section of the nozzle throat 48, the propellant has much more opportunity to recondense by flowing through the larger outer passages 44 because the propellant in the outer jacket is cooler and the stay time of the propellant in the outer jacket is at least four times (2.0 vs. 0.5 secs.) that of the inner jacket.

Furthermore, the very low coolant velocity needed to obtain a low value of valve response (about 2.0 ft./sec.) is readily achieved since the outer jacket coolant feeds directly into the fuel valve 22. A velocity of 7.0 ft./sec. is required for a 20 mil sec. pulse, therefore a 2 ft./sec. coolant flow velocity should reduce the minimum pulse width to approximately 10 mil secs.

It will thus be seen that the radiation thermal barrier or gap 28 between the radiation liner 12 and the coolant jacket inner cylinder wall 30 fulfills two important functions within the thrust chamber 10. In addition to providing a zero mass insulation to further reduce the heat transfer rate without incurring a heat soak penalty it reduces the heat transfer rate to such low absolute levels to prevent excessive gradients (liquid-side wall to coolant) during soak cycles and thereby permits the effective use of the novel double cooling jacket disclosed.

The significance of the foregoing is clear in view of the fact that bulk MMH boils at 380° F. at 180 p.s.i.a. and decomposes at an unacceptable rate at 500° F. (independent of pressure) and it is therefore mandatory to soak out at low temperatures (approximately 340° F.) with a fuel inlet temperature of 160° F., and to prevent the liquid-side wall temperature from exceeding 430° F. (380+50° F.). Similarly, temperatures in excess of 430° F. should not occur over a significant axial length of surface (0.50–1.00 inch) and for not more than several seconds.

Valve response needs are in direct conflict with thrust chamber thermal (cooling) requirements. Systems analyses indicate a coolant velocity of 7–10 ft./sec. is necessary to minimize fluid acceleration (inertia force) as the valve opens to demand flow. Because the heat transfer rate through the present thrust chamber 10 is characteristically low (0.05–0.10 B.t.u./in.$^2$ sec.) it is possible to operate the coolant jacket in this velocity range without incurring a hazardous liquid-side wall temperature.

It is customary to use exhaust nozzle throat inserts of various types and materials in order to prevent excessive wear, burnout, etc. thereof. It is also desirable to avoid excessive thermal storage therein when operating pulse mode and the present invention eliminates this problem.

In order to minimize the heat stored in the insert, the density and the specific heat must be minimized, and the insert material should have high conductivity (high values thermal diffusivity) to provide a low average insert temperature. Heat storage may be minimized by good thermal contact of the insert with the cooling jacket, and by the use of a ceramic oxide thermal barrier ($ZrO_2$, $HfO_2$ or $ThO_2$) .020 to.030 inch thick on the gas-side of the nozzle insert. Such an oxide coating thermal barrier is desirable because of its following characteristics:

(1) Chemical inertness of the oxide (it is already oxidized).

(2) Additional thermal barrier since the oxides are very poor conductors.

(3) Very high melting points (4500–6000° F.) and densities (SG 5:0 to 10:0).

(4) Low specific heats are characteristic of the above oxides—particularly at high temperatures.

(5) Ability to withstand hard vacuum. Oxides ($ZrO_2$, $AlO_3$, etc.) have been used successfully for many years in hard vacuum heat treating furnaces at operating temperatures of 5000° F.

(6) A strong bond of oxide to a properly prepared metal surface is readily achieved by the plasma gun technique.

(7) A $10^6$ rad radiation dose does not deteriorate the oxides.

It is often pointed out that since oxides are porous the substrate is in effect not protected from the hostile environment. However, tests prove that a stagnant layer of oxidizing environment does not attack the substrate at anywhere near the rate that occurs within the shear layers of a highly turbulent boundary layer (rocket engine). This is further supported by the phenomenal oxidation resistance (hours at 4000–4500° F.) predicted by torch tests of various coatings. However, the same materials exposed directly to the turbulent boundary layer of combustion gases fail miserably in seconds. This, for example, is also true of nickel and IRFNA. The latter can be stored in nickel containers—even boiled in the acid for hours without measurable mass loss or gain. However, the orifices of a nickel rocket thrust chamber injector flowing IRFNA cannot retain their geometry after seconds of flow.

As seen in FIGURE 1, the throat insert 50 is formed of foamed molybdenum and provided with an oxide coating 52 as discussed hereinbefore. The insert is formed in two arcuate halves and when in position at the throat 48 of the thrust chamber 10, a copper band 54 is shrunk over the halves to contain them and to press them tightly against the radiation liner 12, 14 at the throat 48. This provides improved thermal conductivity from the liner and lowers the gas-side wall temperature in the throat section.

It will be appreciated that the copper band 54 also provides additional heat sink to lower the liquid-side wall transient temperatures of the inner coolant jacket wall 30 during shut down. The increase in thermal diffusivity also improves the effectiveness of the outer jacket as a heat sink. The decrease in height of the inner helical cooling fins 40 behind the throat inset 50 increases the heat transfer to the fuel coolant and trades-off coolant bulk temperature rise for some of the heat stored as a result of use of the copper band.

To minimise bulk temperature rise of the oxidizer, the oxidizer injector 16 is provided with a thermal radiation shield 56 to prevent incipient nucleate boiling of the oxidizer. The shield 56 is spaced from the outer injector face 57 and some thermal conduction occurs across the gap due to the stagnant gas therein. This condition exists since the shield is vented to the chamber to sense chamber pressure through the wall on the oxidizer spud. If, however, the shield is electron beam welded (done in a vacuum environment) to the oxidizer face and chamber pressure is sensed in another location, the radiation mode is the only mode present to transfer heat to the oxidizer. A low emissivity coating 58 (high reflectivity) is placed over the face of the shield while high emissivity coatings (good radiators and absorbers) are placed over the inside surface of the radiation shield 56 and the outside surface of the oxidizer spud (injector face) 57.

It will now be apparent that the rocket thrust chamber of the present invention will be significantly more efficient in operation and will have very low heat transfer to its enclosure or airframe due to the novel and combined use of a low mass radiation liner with a radiation thermal barrier behind it, a minimum heat storage nozzle insert, a double coolant jacket with coolant fins to increase heat sink and heat sink effectiveness, and low jacket coolant velocity to obtain a fast subsystem response.

It is to be understood that the form of the invention herewith shown and described is to be taken as a preferred example of the same and that various changes in the shape, size, and arrangement of parts may be resorted to without departing from the spirit of the invention or the scope of the subjoined claims.

We claim:

1. A rocket thrust chamber comprising, in combination, a low mass radiation liner defining a combustion chamber terminating in a nozzle including a throat; a coolant jacket spaced from said liner and defining a thermal radiation barrier therewith; and an insert of a material having high heat conductivity surrounding said throat and contacting it and said jacket; and means for circulating propellant through said jacket and injecting it into said chamber.

2. The combination recited in claim 1, and means mounted in the head end of said chamber to inject propellant therein to produce a cooling uniform vortex boundary layer with minimum flow disturbance of fuel-rich combustion products along the gas side of said liner upon such injection.

3. The combination recited in claim 1 wherein said insert has an oxide coating.

4. The combination recited in claim 1 wherein said thermal radiation barrier comprises an air space between said liner and said jacket.

5. The combination recited in claim 1 wherein said coolant jacket comprises inner and outer coolant circulation passages and said coolant first passes rearwardly along said barrier and said insert.

6. The combination recited in claim 5 wherein said inner passages in the area of said insert are smaller than in the area of said barrier to increase the velocity of flow therealong.

7. The combination recited in claim 5 wherein said outer passages are larger than said inner passages to decrease the velocity of flow of said coolant.

8. The combination recited in claim 6 wherein said inner passages in the area of said insert are smaller to initially effect an increase in the velocity of flow therealong.

9. The combination recited in claim 1 wherein said insert is provided with a heat sink in the form of a metallic band to press it against the throat of the nozzle.

10. The combination recited in claim 2 wherein said insert has an oxide coating.

11. The combination recited in claim 2 wherein said thermal radiation barrier space between said liner and said jacket is evacuated.

12. The combination recited in claim 2 wherein said coolant jacket comprises inner and outer coolant circulation passages and said coolant first passes rearwardly along said barrier and said insert.

13. The combination recited in claim 12 wherein said outer passages are larger than said inner passages to decrease the velocity of flow of said coolant.

14. The combination recited in claim 12 wherein said inner passages in the area of said insert are smaller than in the area of said barrier to initially effect an increase in the velocity of flow therealong.

15. The combination recited in claim 1 wherein said cooling jacket comprises a plurality of concentric cylinders defining inner and outer liquid coolant chambers positioned exteriorly of and closely adjacent the chamber wall; concentric, radially aligned cooling fins connecting said cylinders and defining generally helical liquid coolant flow passages; said passages being in communication adjacent the exhaust end of the thrust chamber; and means for directing coolant fluid first along said inner flow passages and then in return along said outer flow passages to cool said thrust chamber.

16. The combination recited in claim 15 wherein said inner flow passages adjacent said exhaust end are of restricted size to increase the velocity of the coolant liquid therethrough.

17. The combination recited in claim 15 wherein said outer return passages are of greater size than said inner passages to reduce the velocity and permit low velocity flow and condensing of said coolant liquid.

References Cited

UNITED STATES PATENTS

| | | | |
|---|---|---|---|
| 3,086,358 | 4/1963 | Tumavicus | 60—39.66 |
| 3,157,026 | 11/1964 | Lampert | 239—265.11 |
| 3,169,368 | 2/1965 | Munding | 60—258 |
| 3,220,180 | 11/1965 | Heckert | 60—267 |
| 3,267,664 | 8/1966 | Jones | 60—39.66 |
| 3,289,943 | 12/1966 | Thomas | 60—39.66 |

CARLTON R. CROYLE, *Primary Examiner.*

MARK M. NEWMAN, *Examiner.*

D. HART, *Assistant Examiner.*